UNITED STATES PATENT OFFICE.

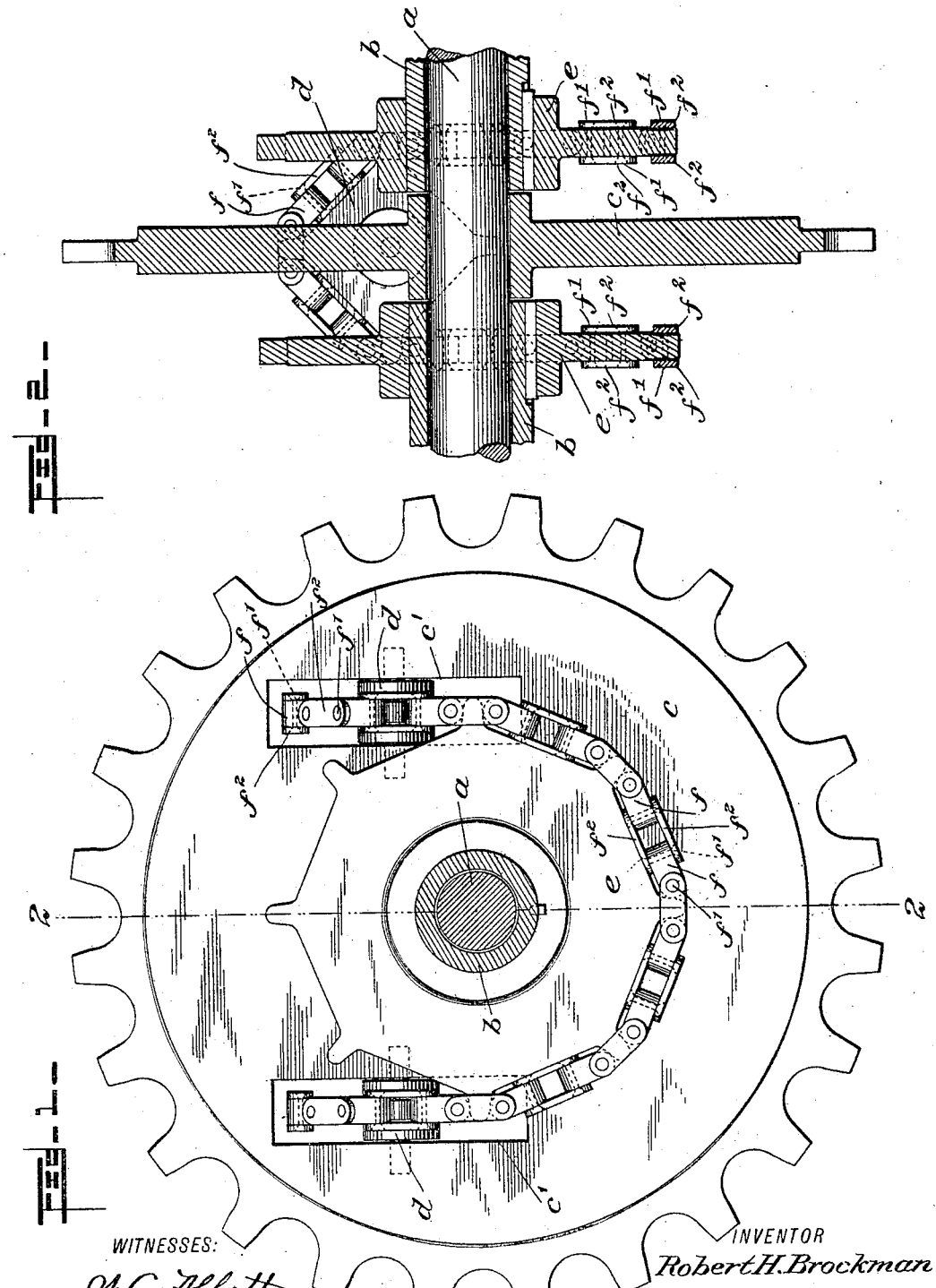

ROBERT H. BROCKMAN, OF NEW YORK, N. Y.

DIFFERENTIAL GEAR.

No. 808,002. Specification of Letters Patent. Patented Dec. 19, 1905.

Application filed July 27, 1904. Serial No. 218,360.

*To all whom it may concern:*

Be it known that I, ROBERT H. BROCKMAN, a citizen of the United States, and a resident of the city of New York, borough of Manhattan, in the county and State of New York, have invented a new and Improved Differential Gear, of which the following is a full, clear, and exact description.

The invention relates to gearing by means of which two independently-revoluble members may be uniformly driven and at the same time allowed a differential turning movement.

The invention is especially adapted for motor-vehicles, but may be used in other connections.

The invention resides primarily in the connection of the driving member with the driven members through the medium of a belt as contradistinguished from the toothed gears hereinbefore employed. Preferably this belt is of the chain type and coacts with sprockets mounted on the driving and driven members.

Reference is to be had to the accompanying drawings, which show as an example the preferred embodiment of my invention, in which drawings like letters of reference indicate like parts in the several views.

Figure 1 is a side elevation of the gear, and Fig. 2 is a longitudinal section thereof on the line 2 2 of Fig. 1.

$a$ indicates the supporting shaft or axle, and $b$ indicates sleeves or tubular shafts turning freely on the central shaft $a$, the tubular shaft $b$ in case the invention is applied to a motor-vehicle being in connection, respectively, with the driving or road wheel thereof.

$c$ indicates the driving member of the gear, which is here shown as a sprocket and is mounted to turn freely on the shaft $a$ between the sleeves $b$. Said driving member $c$ has orifices $c'$ therein, and in said orifices are suitably mounted sprocket-wheels $d$, which turn freely in the orifices $c'$ and carry a peculiar endless sprocket-chain which also passes around sprockets $e$, keyed or otherwise fastened to the sleeves $b$. Upon imparting a driving movement to the members $c$ the wheels $d$ will move bodily with said member, carrying with it the chain, which in turn will cause the sprockets $e$ and the sleeves to which said sprockets are fastened to run, driving the sleeves as a unit from the driving member $c$. This arrangement allows an independent rotative movement of the sleeves, in which case the sprocket-chain has a running movement, also resulting in an independent turning movement of the wheels $d$ around their axis in the driving member or wheel $c$.

The belt or chain connecting the wheels $d$ and $e$, as here shown, is formed of blocks $f$, through which pins $f'$ pass at right angles. These pins are respectively connected with links $f^2$, which lie in pairs, the members of which are situated, respectively, at the sides of the blocks. The chain therefore is made up of links and blocks connected by two sets of pivot-pins, the pivots of one set crossing the axes of the pivots of the other set, thus allowing the chain to turn around sprocket-wheels arranged on axes at right or other angles to each other.

Various changes in the form, proportions, and minor details of my invention may be resorted to without departing from the spirit and scope thereof. I consider myself entitled to all such variations as may lie within the scope of my claims.

Having thus described my invention, I claim as new and desire to secure by Letters Patent—

1. The combination of two driven members, a belt connecting the two, a member engaged with the belt intermediate the driven members, and a gear-wheel adapted to receive a driving movement, the gear-wheel having an orifice therein in which the last-named member is loosely mounted.

2. The combination of two driven members, an endless belt connecting the two, two members engaged with the endless belt intermediate the driven members, and a gear-wheel adapted to receive a driving movement, the gear-wheel having orifices therein in which the last-named members are loosely mounted.

3. The combination of two driven members, a belt connecting the two, a member engaged with the belt intermediate the driven members, and a driving member having an orifice therein in which the said member engaged with the belt is loosely mounted.

4. The combination of two driven members, a wheel attached to each, an endless chain engaged with said wheels, additional wheels engaged with the endless chain between the two wheels first named, and a driving-wheel having orifices therein in which said additional wheels are loosely mounted, said driving-wheel being located intermediate or between the two first-named wheels.

5. The combination of two driven members, a wheel attached to each member, said wheels being spaced apart, an endless belt engaged with the wheels, additional wheels engaged with the endless belt, and a driving-wheel located intermediate the two wheels first named and serving to support the second-named wheels.

In testimony whereof I have signed my name to this specification in the presence of two subscribing witnesses.

ROBERT H. BROCKMAN.

Witnesses:
    JNO. M. RITTER,
    ISAAC B. OWENS.